United States Patent
Kiran et al.

(10) Patent No.: US 10,263,663 B2
(45) Date of Patent: Apr. 16, 2019

(54) M-ARY PULSE AMPLITUDE MODULATION DIGITAL EQUALIZER

(71) Applicant: Intel Corporation, Santa Clara, CA (US)

(72) Inventors: Shiva Kiran, Hillsboro, OR (US); Tzu-Chien Hsueh, Portland, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/973,163

(22) Filed: Dec. 17, 2015

(65) Prior Publication Data

US 2017/0180002 A1 Jun. 22, 2017

(51) Int. Cl.
*H04B 1/00* (2006.01)
*H04B 3/14* (2006.01)
*H04B 14/02* (2006.01)

(52) U.S. Cl.
CPC ........... *H04B 3/145* (2013.01); *H04B 1/0007* (2013.01); *H04B 14/023* (2013.01)

(58) Field of Classification Search
CPC .. H04B 1/0007; H04B 1/0017; H04B 1/0028; H04B 1/0042; H04B 3/143; H04B 3/144; H04B 3/145; H04B 14/023; H03H 2021/0049; H03H 2021/0056; H03H 2021/0065; H03H 2021/009; H03H 2021/0098
USPC ........ 375/232, 233, 346, 348, 350; 708/322, 708/323
See application file for complete search history.

(56) References Cited

U.S. PATENT DOCUMENTS

| | | | | |
|---|---|---|---|---|
| 5,539,774 | A * | 7/1996 | Nobakht | H04L 1/0054 333/18 |
| 7,142,595 | B1 * | 11/2006 | Duvaut | H04L 25/03885 375/232 |
| 8,045,610 | B2 * | 10/2011 | Wang | H04L 25/03057 327/154 |
| 9,077,574 | B1 | 7/2015 | Healey et al. | |
| 9,215,107 | B1 * | 12/2015 | De Bernardinis | H04L 25/03057 |
| 9,313,054 | B1 * | 4/2016 | Liao | H04L 25/03019 |
| 9,337,993 | B1 * | 5/2016 | Lugthart | H04L 7/033 |
| 2002/0080898 | A1 * | 6/2002 | Agazzi | H03M 1/0624 375/355 |
| 2003/0219083 | A1 * | 11/2003 | Graumann | H03M 13/4169 375/341 |

(Continued)

OTHER PUBLICATIONS

"International Application Serial No. PCT/US2016/062509, International Search Report dated Feb. 21, 2017", 3 pgs.

(Continued)

*Primary Examiner* — Young T Tse
(74) *Attorney, Agent, or Firm* — Schwegman Lundberg & Woessner, P.A.

(57) ABSTRACT

Some embodiments include apparatus and methods using an input node, an analog to digital converter (ADC) including an input coupled to the input node, a first feedforward equalizer (FFE) including an input coupled to an output of the ADC, a second FFE including an input coupled to the output of the ADC, and a decision feedback equalizer (DFE) including a first input, a second input, and an output, the first input coupled to an output of the first FFE, and the second input coupled to an output of the second FFE.

14 Claims, 5 Drawing Sheets

(56) References Cited

U.S. PATENT DOCUMENTS

| | | | |
|---|---|---|---|
| 2004/0120394 A1* | 6/2004 | Miao | H04L 25/03063 375/234 |
| 2006/0007997 A1 | 1/2006 | Jones | |
| 2007/0127608 A1* | 6/2007 | Scheim | H04B 7/0413 375/346 |
| 2008/0310495 A1* | 12/2008 | Bulzacchelli | H04L 25/03057 375/233 |
| 2009/0196336 A1* | 8/2009 | Huang | H04L 25/03012 375/232 |
| 2011/0052216 A1* | 3/2011 | Jiang | H04B 10/25133 398/208 |
| 2011/0261873 A1* | 10/2011 | Kim | H04L 1/0047 375/229 |
| 2012/0027074 A1 | 2/2012 | Raghavan et al. | |
| 2013/0230093 A1* | 9/2013 | Aziz | H04L 25/03057 375/233 |
| 2013/0243071 A1 | 9/2013 | Chmelar | |
| 2014/0023132 A1* | 1/2014 | Pandey | H04L 25/03006 375/232 |
| 2015/0016497 A1* | 1/2015 | Aziz | H04L 25/03057 375/233 |
| 2015/0365117 A1* | 12/2015 | May | H04B 1/16 375/316 |
| 2016/0277219 A1* | 9/2016 | Venkatram | H04L 7/033 |

OTHER PUBLICATIONS

"International Application Serial No. PCT/US2016/062509, Written Opinion dated Feb. 21, 2017", 10 pgs.

\* cited by examiner

M-ARY PULSE AMPLITUDE MODULATION DIGITAL EQUALIZER

TECHNICAL FIELD

Embodiments described herein pertain to data transmission. Some embodiments relate to equalizers.

BACKGROUND

Many electronic devices or systems, such as computers, tablets, and cellular phones, include components (e.g., integrated circuit chips) located on a circuit board. The components may communicate with each other using signals that can carry information (e.g., data). The signals are usually transmitted on conductive lines, such as metal-based traces, on the circuit board. Each of the signals may be organized into symbols. Each symbol is a portion of the signal within a fixed period of time.

In the pulse-amplitude modulation (PAM) technique, each symbol can be used to transmit one bit or multiple bits of information. In this technique, the signal is modulated at different amplitudes based on the values of the bits associated with the symbols. For example, in binary PAM (2-PAM) signaling, each symbol can have either one of two possible amplitude values, depending on the value (e.g., either binary 0 or 1) of the bit associated with that symbol. In other M-ary PAM (e.g., 4-PAM, 8-PAM, etc.) signaling, each symbol can have either one of M amplitude values. In some situations, transmitting signals using M-ary PAM techniques may be more favorable than some other techniques. However, in some systems, using an M-ary PAM-based technique may increase device area, power, and circuit complexity.

DETAILED DESCRIPTION

In some digital PAM communication systems, an M-ary PAM technique may be more attractive than some other techniques (e.g., non-return-to-zero (NRZ) modulation). Some conventional techniques may use a digital loop-unrolled decision-feedback equalizer (DFE) in M-ary PAM systems. However, such techniques can increase device area and power. For example, circuit components such as summers and slicers used in a 4-tap DFE in a 4-PAM system can be multiple times more than that used in a 2-PAM system. Some alternative techniques, such as look-ahead loop-unrolled architectures, are proposed in order to relax the timing requirement of the DFE critical path in the system. However, such alternative techniques may increase circuit complexity in M-ary PAM systems.

The technique described herein improves a look-ahead loop-unrolled N-tap DFE in M-ary PAM systems. The technique described herein uses multiple feedforward equalizers (FFEs) in combination with an improved look-ahead loop-unrolled N-tap DFE in a receiver architecture. One of the FFEs in the receiver can operate as a primary FFE in a main FFE-DFE signal equalization path of the receiver. The other FFE of the receiver can be arranged in parallel with the primary FFE and can operate as a secondary (e.g., parallel) FFE to eliminate unnecessary possible decisions among all of the possible decisions used in the DFE. This elimination allows the look-ahead loop-unrolled technique described herein to use fewer possible decisions during precomputing possible values of a current symbol.

In some examples, to eliminate unnecessary decisions in the receiver (e.g., an M-ary PAM receiver) described herein, the secondary FFE output may be partially equalized (e.g., only partial equalization is performed on the received symbols) in order to indicate the region in which the previous symbol falls. Thus, relative to the primary FFE, the secondary FFE can be less complex (e.g., 2-tap or 3-tap FFE) with sufficient bit error rate (BER) output. This may assist the DFE to ignore unnecessary decisions, which are located outside of the indicated regions identified by the secondary FFE. The signal integrity of the receiver may still be handled by the primary FFE and the DFE in the main signal equalization path. The technique described herein may lead to an improvement (e.g., a reduction) in at least one of circuit complexity, device area, latency in critical path, and power consumption in the receiver.

Figure 1:
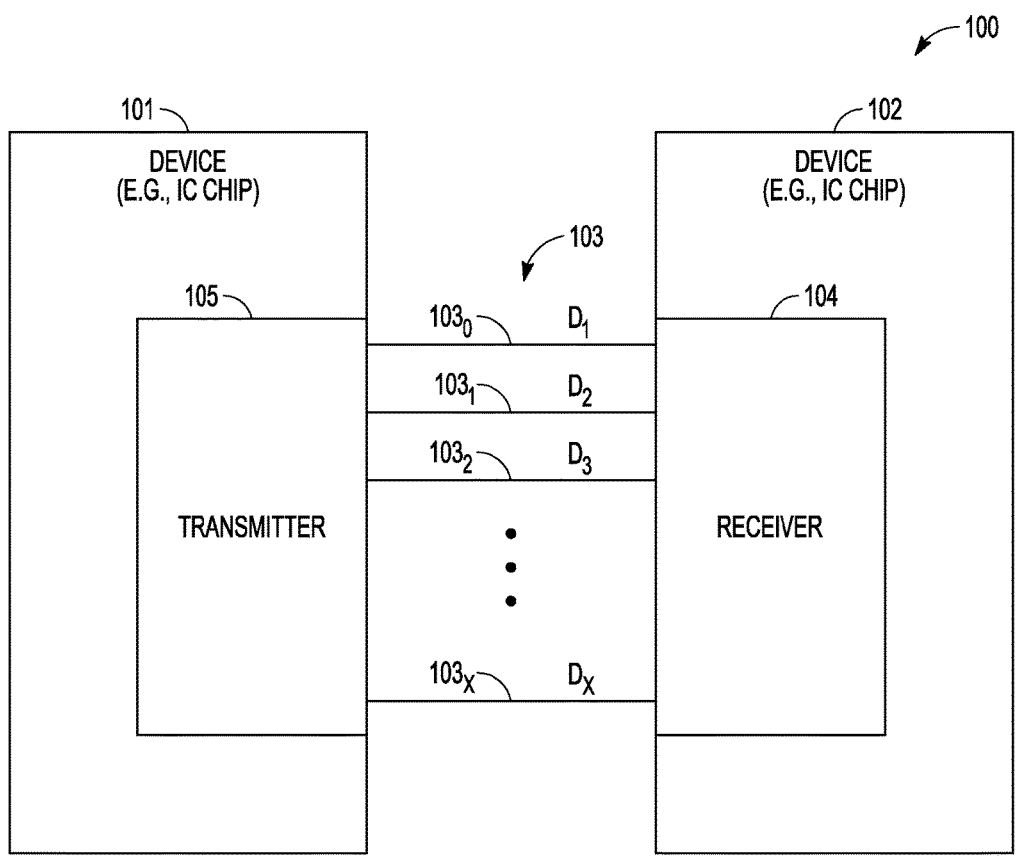
FIG. 1 shows an apparatus including devices and a channel between the devices, according to some embodiments described herein.

FIG. 1 shows an apparatus 100 including devices 101 and 102, and a channel 103 between devices 101 and 102, according to some embodiments described herein. Apparatus 100 can include or be included in an electronic device or system, such as a computer (e.g., server, desktop, laptop, or notebook), a tablet, a cellular phone, or other electronic devices or systems. Each of devices 101 and 102 can include an integrated circuit (IC), such as an IC chip. Devices 101 and 102 can include controllers (e.g., processors, input/output controllers, memory devices, or other electronic devices). As shown in FIG. 1, devices 101 and 102 can include a transmitter 105 and a receiver 104, respectively.

Channel 103 can provide communication (e.g., in the form of signal transmission) between devices 101 and 102. Channel 103 can include lanes $103_0$, $103_1$, and $103_2$ through $103_X$ to conduct signals between devices 101 and 102. Each of lanes $103_0$ through $103_X$ can include one or more conductive trace (e.g., metal-based traces) on a circuit board (e.g., printed circuit board) where devices 101 and 102 are located. Devices 101 and 102 can communicate with each other by providing signals on lanes $103_0$ through $103_X$. As shown in FIG. 1, for example, transmitter 105 may transmit signals $D_0$, $D_1$, and $D_2$ through $D_X$ to receiver 104 on lanes $103_0$, $103_1$, and $103_2$ through $103_X$, respectively. In an alternative arrangement, channel 103 does not have to include conductive lines on a circuit board. For example, channel 103 can include a medium (e.g., air) for wireless communication between devices 101 and 102.

Receiver 104 and signals $D_0$, $D_1$, and $D_2$ through $D_X$ can include receivers and signals described below with reference to FIG. 2 through FIG. 7.

Figure 2:
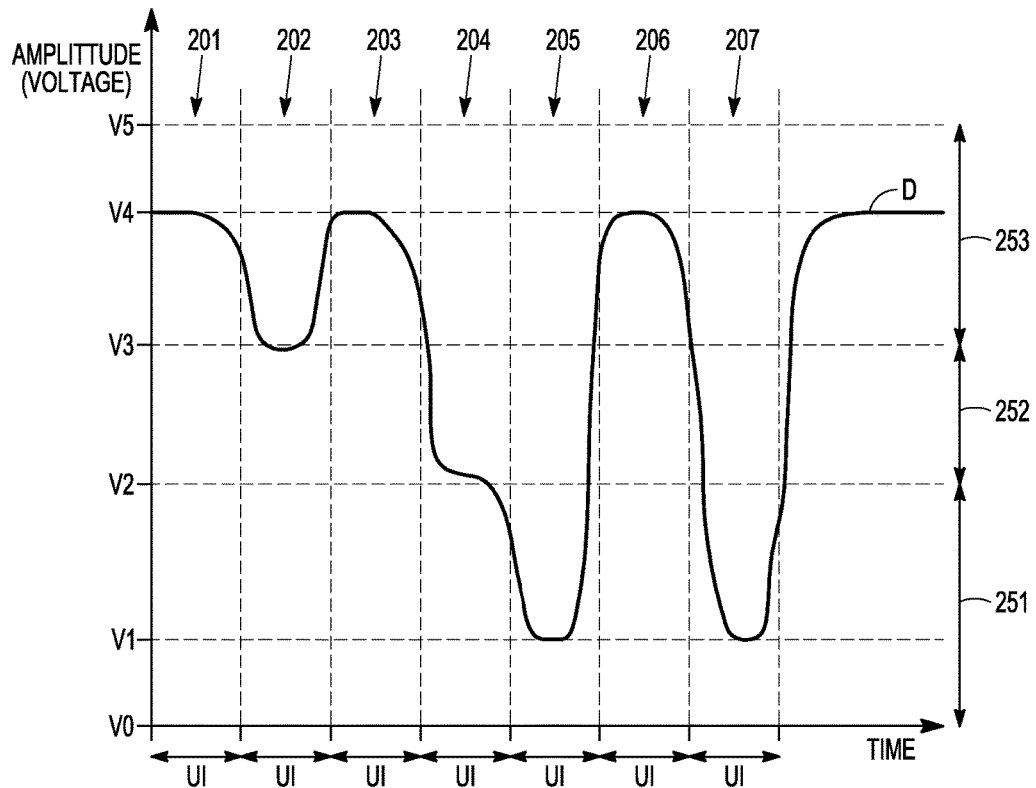
FIG. 2 is an example timing diagram for a signal that can correspond to one of the signals of FIG. 1, according to some embodiments described herein.

FIG. 2 is an example timing diagram for a signal D that can correspond to one of signals $D_0$, $D_1$, and $D_2$ through $D_X$ of FIG. 1, according to some embodiments described herein. As shown in FIG. 2, signal D can include symbols 201 through 207 (e.g., seven symbols). Each of symbols 201 through 207 includes a portion (e.g., a segment) of signal D within a respective unit interval UI. FIG. 2 shows seven unit intervals (UIs) associated with seven respective symbols 201 through 207 of signal D. The value (e.g., in time unit) of each UI can be equal to the value of a period (or a fraction of the period) of a clock signal (e.g., used by receiver 104 of FIG. 1) to capture signal D.

Signal D can be transmitted on channel 103 (FIG. 1) using PAM techniques. For purposes of this description (e.g., in the description of FIG. 2 through FIG. 5), each of the symbols included in a signal received by a receiver (e.g., 104 in FIG. 1) is assumed to be used to carry (e.g., transmit) two bits (e.g., binary "00", "01", "10", or "11") of information. However, the receiver described herein can operate with symbols used to carry more than two bits of information. In the example of signal D of FIG. 2, each of symbols 201 through 207 can be used to carry two bits of information.

The value of the two bits associated with a particular symbol in signal D can be based on the amplitude value of that particular symbol. The amplitude value of a symbol can correspond to a voltage value of the symbol. FIG. 2 shows four example voltage values V1, V2, V3, and V4, which correspond to four amplitude values of signal D.

Since each of symbols 201 through 207 can be used to carry two bits of information, voltage values V1, V2, V3, and V4 can be used to present four possible values (binary values) of the two bits. As an example, voltage values V1, V2, V3, and V4 can be used to represent binary values "00", "01", "10", and "11", respectively. Thus, in the example of FIG. 2, the two bits associated with symbol 201 may have a value of "11". The two bits associated with symbol 202 may have a value of "10". Similarly, each of symbols 203, 204, 205, 206, and 207 can be associated with two respective bits that may have values of "11", "01", "00", "11", and "00", respectively.

The symbols (e.g., 201 through 207) of signal D can be received sequentially at a receiver (e.g. receiver 104 in FIG. 1). For example, if symbol 205 is the current symbol (e.g., symbol (n)) being received by a receiver, then symbol 204 is the previous symbol (e.g., symbol (n−1) is received before symbol 205 is received) and symbol 206 is the next (e.g., symbol (n+1) is received after symbol 205 is received) symbol.

Figure 3:
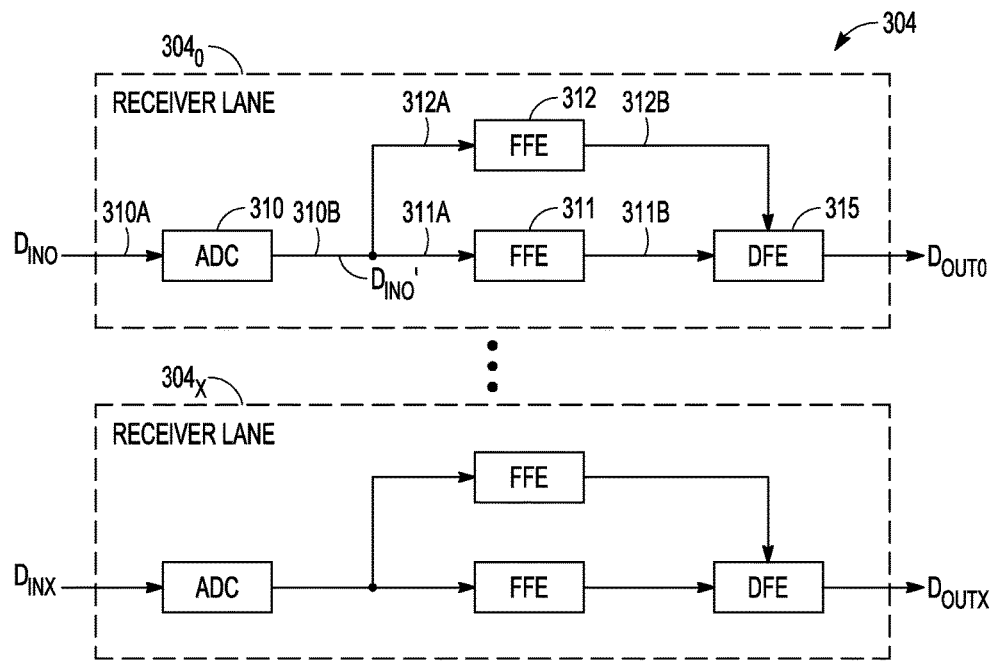
FIG. 3 shows a block diagram of a receiver having receiver lanes and multiple feedforward equalizers and a decision-feedback equalizer in each of the receiver lanes, according to some embodiments described herein.

As is known to those skilled in the art, interference (e.g., inter-symbol interference (ISI)) or other undesirable factors (e.g., noise) may occur in the signal, such as signal D, when it is transmitted on a channel (e.g., 103 in FIG. 3). The interference (e.g., ISI) may cause the amplitude values of the symbol to deviate from their intended values (e.g., ideal values) at the time the symbols are received (e.g., sampled) by the receiver. For example, when symbols 201 through 207 are received by receiver 104 (FIG. 1), their respective amplitude values may deviate from intended voltage values of V1, V2, V3, and V4. The received amplitude value of a particular symbol may fall in one of regions 251, 252, and 253, depending on the intended amplitude value of the symbol.

For example, when symbol 202 is received (sampled) by receiver 104 (FIG. 1), the sampled amplitude value of symbol 202 may not be at voltage value V3 (e.g., intended value); but it may be at another voltage value, such as a voltage value in a region 253, which is between voltages V3 and V5. In another example, when symbol 204 is received (sampled) by receiver 104, the sampled amplitude value of symbol 204 may not be at voltage value V2; but it may be at another voltage value, such as a voltage value in a region 252, which is between voltages V2 and V3.

As described above, interference (e.g., ISI) may occur in the signal received by receiver 104. The receiver described herein can be configured to perform equalization operations to improve the quality of the received signal (e.g., signal D). This can lead to improved accuracy in determining the value of information included in the signal.

FIG. 3 shows a block diagram of a receiver 304 including multiple feedforward equalizers (FFEs) 311 and 312, according to some embodiments described herein. Receiver 304 can be used as receiver 104 of FIG. 1. As shown in FIG. 3, receiver 304 can include receiver lanes $304_0$ through $304_X$ to receive different input information at different inputs (e.g., different input nodes) and provide (e.g., generate) different output information at different outputs (e.g., different output nodes)). For example, receiver lane $304_0$ can receive information (e.g., input information) $D_{IN0}$ and provide information (e.g., output information) $D_{OUT0}$. Receiver lane $304_X$ can receive information (e.g., input information) $D_{INx}$ and provide information (e.g., output information) $D_{OUTx}$. Information $D_{IN0}$ and $D_{INx}$ can be analog information. Information $D_{OUT0}$ and $D_{OUTx}$ can be digital representations of information $D_{IN0}$ and $D_{INx}$, respectively. Each of receiver lanes $304_0$ through $304_X$ can perform a similar equalization on respective input information (e.g., input signal) to provide respective output information (e.g., bits of information).

Each of information $D_{IN0}$ and $D_{INx}$ can be provided by a different signal. For example, information $D_{IN0}$ can be provided by a signal, such as signal $D_0$ of FIG. 1, and information $D_{INx}$ can be provided by another signal, such as signal $D_X$ of FIG. 1.

As shown in FIG. 3, receiver lane $304_0$ can include an analog-to-digital converter (ADC) 310, FFE 311, FFE 312, and a decision feedback equalizer (DFE) 315. FFE 311 and DFE 315 can operate in combination on the main signal equalization path of receiver lane $304_0$. As shown in FIG. 3, receiver lane $304_X$ can also include components similar to receiver lane $304_0$ (e.g., an ADC, multiple FFEs, and a DFE) arranged in ways similar to that of receiver lane $304_0$. Receiver lane $304_X$ can also have a main signal equalization path formed by the DFE and one of the FFEs similar to receiver lane $304_0$. For simplicity, the description herein describes the detail of only one receiver lane (e.g., $304_0$) of receiver 304. The structure and operations of other receiver lanes (e.g., $304_X$) of receiver 304 are similar to, or the same as, that of receiver lane $304_0$.

ADC 310 can include an input (e.g., a node or nodes) 310A to receive information $D_{IN0}$ and an output (e.g., a node or nodes) 310B to provide information $D_{IN0}'$. The inputs of FFE 311 and FFE 312 can be coupled to the same output (310B) of ADC 310. For example, FFE 311 and 312 can include respective input (e.g., nodes) 311A and 312A coupled to output 310B of ADC 310. DFE 315 can be coupled to outputs (e.g., output nodes) 311B and 312B of FFE 311 and FFE 312, respectively. DFE 315 can be configured (e.g., structured) to operate as a look-ahead loop-unrolled DFE.

Information $D_{IN0}$ can be provided by a signal that can have waveforms similar to signal D of FIG. 2. Thus, in FIG. 3, information $D_{IN0}$ can include symbols (e.g., 201 through 207 of FIG. 2) in which the amplitude value of each of the symbols can represent a value of multiple bits (e.g., two bits) of information. Information $D_{IN0}'$ is a digital representation of information $D_{IN0}$. Information $D_{IN0}'$ can include values (e.g., digital value) based on the amplitude values of symbols (e.g., similar to symbols 201 through 207 of FIG. 2) included in information $D_{IN0}$.

In FIG. 3, FFE 311 can operate as a primary FFE in receiver lane $304_0$ to cancel ISI in the received symbols to generate equalized symbol values of the received symbols. Based on the equalized symbol value, DFE 315 can perform equalization based on a look-ahead loop-unrolled technique. In this technique, DFE 315 precomputes all possible equalized symbol values of the current symbol. As part of this precomputing operation, possible decisions of each previous symbol are used to precompute all possible summations to cancel the ISI on the current symbol. As described in more detail below, FFE 312 can operate to assist DFE 315 to reduce the number of precomputed possible summations.

Figure 4:
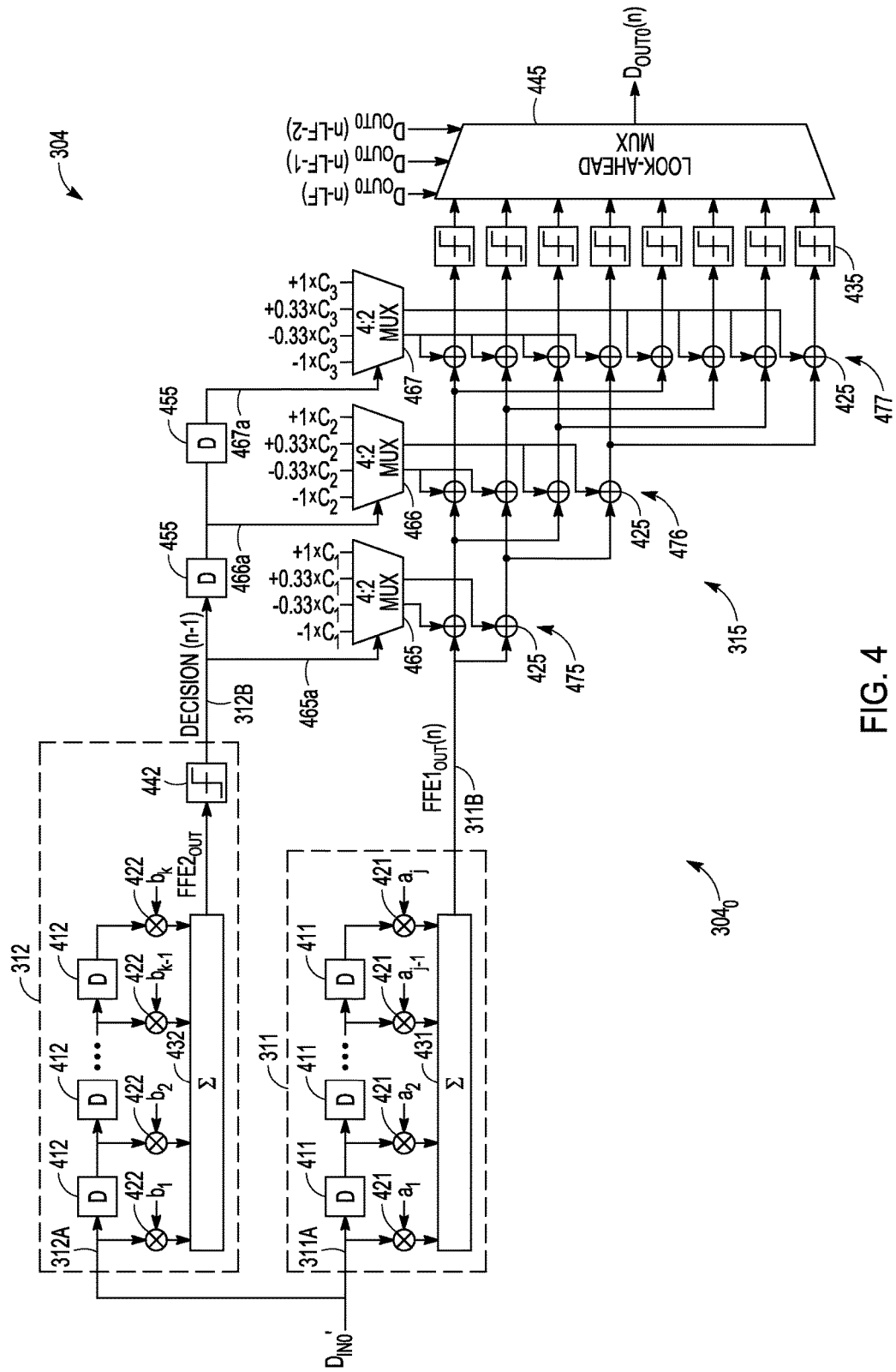
FIG. 4 shows a block diagram of the feedforward equalizers and decision-feedback equalizer of a receiver lane of the receiver of FIG. 3, according to some embodiments described herein.

FIG. 4 shows a block diagram of FFE 311, FFE 312, and DFE 315 of receiver lane $304_0$ of receiver 304 of FIG. 3, according to some embodiments described herein. FIG. 4 shows an example of a 4-PAM 3-tap DFE structure that can operate to process symbols where each of the symbols is associated with two bits of information. However, the technique described herein can be applied to other M-ary PAM N-tap DFE structures.

As shown in FIG. 4, FFE 311 (e.g., primary FFE) can include delay circuits 411, multiplier circuits 421 with associated coefficients $a_1$ through $a_J$, and a summer circuit 431. FFE 311 receives information $D_{IN0}'$ (at its input 311A) and performs an equalization operation on the symbols included in information $D_{IN0}'$ and generates information (at output 311B) that includes equalized symbol values of the received symbols. Information $FFE1_{OUT}$ (n) at output 311B represents the equalized symbol value of the current symbol (e.g., symbol (n)) being processed by receiver lane $304_0$.

FFE 312 (e.g., parallel FFE) can include delay circuits 412, multiplier circuits 422 with associated coefficients $b_1$ through $b_K$, and a summer circuit 432. FFE 312 receives information $D_{IN0}'$ and performs an equalization (e.g., partial equalization) operation on the symbols included in information $D_{IN0}'$ and generates information $FFE2_{OUT}$ that includes equalized (e.g. partial equalized) symbol values of the received symbols. FFE 312 can include a region identifier (e.g., comparator) 442 that can operate to generate information Decision (n−1). As described in more detailed below, information Decision (n−1) contains an indication (e.g., a value) that identifies most-likely regions (e.g., a range of values) among possible regions (e.g., similar to regions 251, 252, and 253 of FIG. 2) into which a symbol (e.g., previous symbol) falls. Based on information Decision (n−1), DFE 315 can reduce the number of possible decisions of each previous symbol used to precompute the possible equalized symbol values of the current symbol. For example, in operation, DFE 315 may precompute the possible equalized symbol values of the current symbol based on the identified regions (e.g., most-likely regions) of the previous symbol and ignore the other regions (e.g., least-likely regions).

FIG. 4 shows region identifier 442 being part of FFE 312 as an example. However, region identifier 442 can be located at another location in receiver 304 (e.g., as part of DFE 315) as long as it can provide information Decision (n−1) that identifies most-likely regions associated with a symbol.

DFE 315 can include summers 425 (only three of 16 summers 425 are labeled), slicers 435 (eight slicers 435), a multiplexer (e.g., look-ahead multiplexer) circuit 445, delay circuits 455 (to provide a time delay), and multiplexer circuits 465, 466, and 467. Each of multiplexer circuits 465, 466, and 467 can include a number of multiplexers (not shown) that can operate (e.g., as a 4:2 multiplexer) to select two of four inputs as two outputs. Each of slicers 435 can include comparator circuitry and logic that can perform comparison operations and make decisions based on inputs from a respective summer among summers 425. Multiplexer circuit 445 can include a number of multiplexers (not shown) that can operate to select one of the inputs (e.g., decisions) provided to multiplexer circuit 445 (e.g., provided by slicers 435) and provide the selected input (e.g., a correct decision) to the output of multiplexer circuit 445.

As mention above, FIG. 4 shows an example where receiver 304 is configured (e.g., structured) to operate as a 4-PAM 3-tap look-ahead loop-unrolled DFE. Thus, each of the symbols included in information $D_{IN0}'$ can have a symbol value that represents one of four possible combinations of two bits. DFE 315 can operate to generate information $D_{OUT0}$ (n) (at the output of multiplexer circuit 445), which represents bit values (e.g., "00", "01", "10", or "11") of the two bits represented by the equalized symbol value (presented by information FFE1out (n)) of the current symbol.

As is known to those skilled in the art, some techniques used in some conventional look-ahead loop-unrolled DFEs may precompute all possible summations as part of precomputing all possible equalized symbol values of the current symbol. Such techniques may use all possible decisions of each previous symbol in the precomputing of all possible summations to cancel the ISI on the current symbol. Then, possible decisions of the current symbol are determined based on the summations. One of the possible decisions is selected to be the correct decision of the current symbol.

In comparison with some conventional look-ahead loop-unrolled DFEs, DFE 315 of receiver 304 has different (e.g., modified) structure and operates in a simplified look-ahead loop-unrolled fashion. In the operations of receiver 304, DFE 315 uses fewer than all of the possible decisions of each previous symbol used in the precomputing of possible summations that provide possible equalized symbol values of the current symbol. For example, during an operation associated with a current symbol, DFE 315 performs a precomputing operation to precompute all possible equalized symbol values of the current symbol (presented by information $FFE2_{OUT}$ (n)). DFE 315 uses summers 425 and information from the outputs of multiplexer circuits 465, 466, and 467 to precompute all possible summations to cancel the ISI on the current symbol. The outputs of each of multiplexer circuits 465, 466, and 467 provide information associated with only a portion of all possible decisions (fewer than all possible decisions) of each previous symbol. Thus, DFE 315 may not use all but only a portion (fewer than all) of the possible decisions of each previous symbol in the precomputing of possible summations that provide possible equalized symbol values of the current symbol. For example, if each symbols is associated with B bits, where B is an integer greater than two, then DFE may use less than $2^B$ possible decisions of each previous symbol in the pre-computing of possible summations that provide possible equalized symbol values of the current symbol. The determination of which portion of all possible decisions of each previous symbol to be used is performed by FFE 312, as described in more detail with reference to FIG. 5.

In FIG. 4, after the possible summations are precomputed by summers 425, DFE 315 uses slicers 435 to perform decision operations. The decision operations determine all possible decisions (e.g., possible values) of the current symbol. The possible decisions are provided to (e.g., fed as inputs) to inputs of multiplexer circuit 445. Multiplexer circuit 445 can operate to select one of the possible decisions (provided by slicer 435) to be the correct decision of the current symbol. Information $D_{OUT0}$ (n) at the output of multiplexer circuit 445 includes information (based on the correct decision) that represents the bit values (e.g., "00", "01", "10", or "11") of the two bits associated with information $FFE1_{OUT}$(n) of the current symbol.

As shown in FIG. 4, multiplexer circuit 445 can use three pieces of select information $D_{OUT0}$ (n-LF), $D_{OUT0}$ (n-LF-1), and $D_{OUT0}$ (n-LF-2) and operate as an 8:1 multiplexer to select one of the eight possible decisions (provided by slicers 435) as the correct decision of the current symbol. Select information $D_{OUT0}$ (n-LF), $D_{OUT0}$ (n-LF-1), and $D_{OUT0}$ (n-LF-2) can be provided by feedback paths (not shown) coupled to the output of multiplexer circuit 445. LF is a look-ahead factor associated with multiplexer circuit 445. The values of select information $D_{OUT0}$ (n-LF), $D_{OUT0}$ (n-LF-1), $D_{OUT0}$ (n-LF-2) can be obtained based on the value of the output of multiplexer at LF, LF-1 and LF-2 time instants, respectively, before the current time instant associated with information $D_{OUT0}$(n).

As described above, DFE 315 uses fewer than all of the possible decisions of each previous symbol in the precomputing of possible summations that provide possible equalized symbol values of the current symbol. In FIG. 4, the inputs of each of multiplexer circuits 465, 466, and 467 can be provided with four possible decisions of each previous symbol (based on the example of 4-PAM). The four possible decisions are associated with values -1, -0.33, +0.33, and +1 and coefficients $c_1$, $c_2$, and $c_3$. The values of $c_1$, $c_2$, and $c_3$ can be set based on characteristics (e.g., physical properties) of the channel (e.g., 103) or based on the observed quality of signals (e.g., $D_0$ through $D_X$ in FIG. 1) received by receiver 304.

Each of multiplexer circuits 465, 466, and 467 can operate to select two of all possible decisions (four possible decisions) of the previous symbol to be the most-likely possible decisions. The selected (most-likely) possible decisions are used by DFE 315 in the precomputing of possible summations as part of precomputing all possible equalized symbol values of the current symbol. The selection by multiplexer circuits 465, 466, and 467 can be based on information Decision (n-1) provided by FFE 312.

Based on information Decision (n-1), at different stages 475, 476, and 477, multiplexer circuits 465, 466, and 467 can operate to select two of all possible decisions (four possible decisions) of the previous symbol to be the most-likely possible decisions. The selected most-likely possible decisions are used by DFE 315 in the precomputing of possible summations as part of precomputing all possible equalized symbol values of the current symbol. As shown in FIG. 4, stages 475, 476, and 477 can be performed one after another (e.g., sequentially) with a time delay (provided by delay circuits 455) between stages 475, 476, and 477. Multiplexer circuits 465, 466, and 467 in respective stages 475, 476, and 477 can use information Decision (n-1) provided at their respective select inputs (e.g., multiplexer select inputs) 465a, 466a, and 467a as select information (e.g., multiplexer select signals) to select a portion of all possible decisions to their outputs (multiplexer output).

For example, multiplexer 465 can select two of all possible decisions (four possible decisions) $-1 \times c_1$, $-0.33 \times c_1$, $0.33 \times c_1$, and $1 \times c_1$ to be the most-likely possible decisions to be used at stage 475 in the precomputing of possible summations as part of precomputing all possible equalized symbol values of the current symbol. Multiplexer circuit 466 can select two of all possible decisions (four possible decisions) $-1 \times c_2$, $-0.33 \times c_2$, $0.33 \times c_2$, and $1 \times c_2$ to be the most-likely possible decisions to be used at stage 476 in the precomputing of possible summations as part of precomputing all possible equalized symbol values of the current symbol. Multiplexer circuit 467 can select two of all possible decisions (four possible decisions) $-1 \times c_3$, $-0.33 \times c_3$, $0.33 \times c_3$, and $1 \times c_3$ to be the most-likely possible decisions to be used at stage 475 in the precomputing of possible summations as part of precomputing all possible equalized symbol values of the current symbol.

Information Decision (n-1) contains an indication that indicates which decisions can be eliminated from all possible decisions of the previous symbol. This allows only a portion of all possible decisions of the previous symbol to be used in the precomputing of all possible equalized symbol values of the current symbol. As shown in FIG. 4, information Decision (n-1) is provided by FFE 312. Information Decision (n-1) can be obtained based on information $FFE2_{OUT}$. For example, information $FFE2_{OUT}$ can include an equalized value of a current symbol (e.g., $FFE2_{OUT}$(n)), which can be generated based on the same symbol used to generate $FFE1_{OUT}$(n). Information $FFE2_{OUT}$ can also include an equalized value of a previous symbol (e.g., $FFE2_{OUT}$(n-1)), which can be generated based on a previous symbol. Information Decision (n-1) is generated based on information $FFE2_{OUT}$(n-1). The value of information Decision (n-1) can be obtained based on a probability density function of information $FFE2_{OUT}$, as described below.

Figure 5:
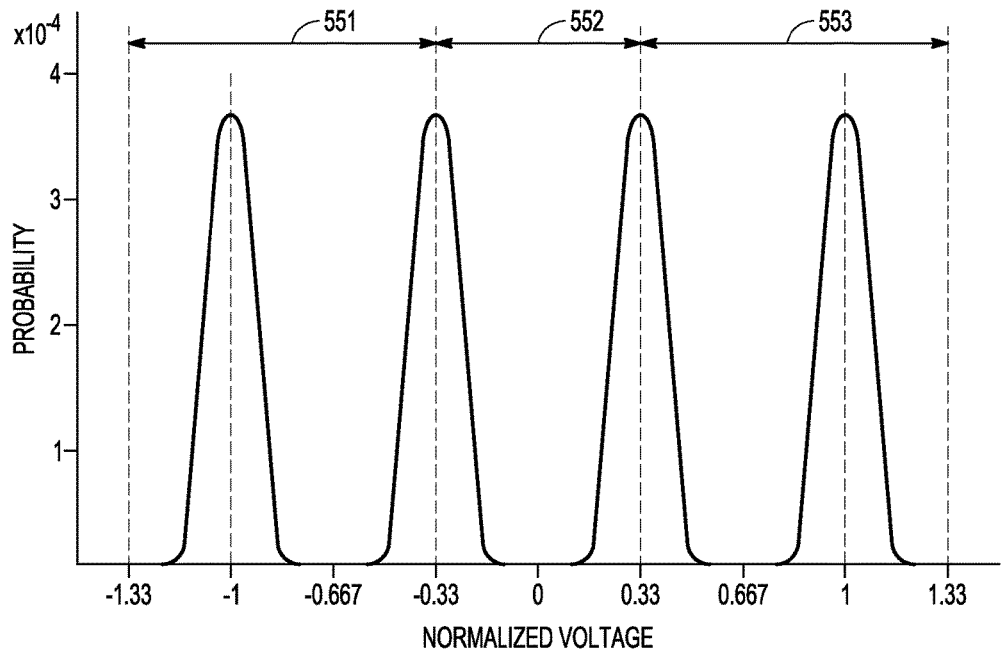
FIG. 5 is a graph showing the probability density function (PDF) of partial equalized symbol values at an output of a feedforward equalizer of the receiver of FIG. 3, according to some embodiments described herein.

FIG. 5 is a graph showing the probability density function (PDF) of the partial equalized symbol values presented by information $FFE2_{OUT}$ of FFE 312, according to some embodiments described herein. In order to provide information Decision (n-1) (FIG. 4) to allow DFE 315 (FIG. 4) to eliminate some of all possible decisions of the previous symbol in the precomputing of all possible equalized symbol values of the current symbol, FFE 312 can partially equalize the previous symbols to obtain partially equalized symbol values of the previous symbols. Then, based on the partially equalized symbol values of the previous symbols, FFE 312 can correctly determine the particular decisions among all possible decisions of the previous symbol that may be unnecessary and can be eliminated in the loop unrolling process. FFE 312 can perform an equalization operation such that previous symbols can be partially equalized to reach a sufficient BER. Then, based on the probability density function (PDF) of FIG. 5, fewer than all four possible decisions of each previous symbol can be used to precompute the possible equalized symbol values of the current symbol. In the example associated with FIG. 5, two most unlikely decisions of the four possible decisions can be safely eliminated during the loop unrolling process.

In FIG. 5, each of the partially equalized symbol values (represented by $FFE2_{OUT}$ of FFE 312) may fall in one of three regions (e.g., voltage value ranges) 551, 552, and 553. Each of regions 551, 552, and 553 has boundaries based on normalized voltage values -1.33, -1, -0.667, -0.33, 0, 0.33, 0.667, 1, and 1.33. As an example, normalized voltage values in FIG. 5 can be based on voltage values V0, V1, V2, V3, V4, and V5 of FIG. 2, in which normalized voltage values -1.33, -1, -0.33, 0.33, 1, and 1.33 can correspond to voltage V0, V1, V2, V3, V4, and V5, respectively. Thus, regions 551, 552, and 553 of FIG. 5 can be based on regions 251, 252, and 253, respectively, of FIG. 2.

In FIG. 5, when a symbol falls in region 551, symbols represented by normalized voltage values of 0.33 and 1 can be eliminated from the loop unrolling process. Thus, FFE 312 can make a partial decision on the symbol. Similarly, when a symbol falls in region 552, symbols represented by normalized voltage values of −1 and +1 can be eliminated from the loop unrolling process (performed by DFE 315 of FIG. 4); when a symbol falls in region 553, symbols represented by normalized voltage values of −0.33 and −1 can be eliminated from the loop unrolling process. Based on this elimination process, FFE 312 can provide information Decision (n−1) with different values, depending on which of the possible decisions are eliminated. Based on the value of information Decision (n−1), DFE 315 can use multiplexers 465, 466, and 467 to selectively determine which of the possible decisions of the previous symbol are to be used in the loop unrolling process, as described above with reference to FIG. 4.

FFE 312 may operate to provide only partially equalized symbol values (represented by information FFE2$_{OUT}$) of the received symbols (represented by information D$_{IN0}$') in order to eliminate unnecessary decisions in receiver 304, thereby identifying the region of the final decisions. Since FFE 312 may only perform a partial equalization operation, the structure of FFE 312 can be relatively less complex (e.g., 2-tap or 3-tap FFE) in comparison with FFE 311. For example, the number of delay circuits 412 and the number of multiplier circuits 422 of FFE 312 can be less than that of FFE 311. The inclusion of FFE 312 in receiver 304 may not impact the equalization operation of receiver 304 and may not introduce noise in receiver 304 because cancellation of ISI is performed by FFE 311 and DFE 315.

The structure of FFE 311 may be more complex than FFE 312 because it is used by receiver 304 as a primary FFE in combination with DFE 315 to perform primary equalization operation (e.g., cancelling ISI) of the received symbols. For example, FFE 311 may have more taps than FFE 312 and the values of coefficients $a_1$ through $a_j$ can also be different from the values of coefficients $b_1$ through $b_k$. However, in some arrangements, FFE 311 and FFE 312 can have similar or the same structure. For example, the number of taps (e.g., multiplier circuits 422) of FFE 312, the values of coefficients $b_1$ through $b_k$, or both, can be the same as that of FFE 311.

The elimination of possible decisions, as described above, can effectively reduce the complexity in DFE 315. For example, in comparison with some conventional look-ahead loop-unrolled DFEs, the number of summers 425, slicers 435, and the number of multiplexers inside multiplexer circuit 445, can be lower. As an example, in comparison with a conventional 4-PAM N-TAP DFE, latency in critical path in DFE 315 (e.g., in multiplexer circuit 445) may reduce (e.g., by one-half) or the speed of DFE 315 may increase (e.g., nearly doubles). Moreover, due to the critical path relaxation, the look-ahead factor can be backed off a little bit to further reduce circuit complexity in DFE 315 (e.g., further reduce the number of multiplexers inside multiplexer circuit 445). As another example, in a conventional 4-PAM N-TAP DFE, the number of summers S' (e.g., similar to summers 425) and the number of slicer C' (e.g., similar to slicers 435) can be based on the equations below.

$$S' = \sum_{i=1}^{N} 4^i \text{ and } C' = 4^N$$

(where N is the number of taps in the DFE).

As a comparison, the number of summers S and slicers C in DFE 315 can be based on the equations below.

$$S = \sum_{i=1}^{N} 2^i \text{ and } C = 2^N$$

Thus, as shown above, S is less than S' (S<S'), and C is less than C' (C<C'). Therefore, in comparison with some conventional look-ahead loop-unrolled DFEs, receiver 304 can have fewer circuit elements (e.g., summers, slicers, multiplexers). This may lead to an improvement (e.g., a reduction) in at least one of circuit complexity, device area, latency in critical path, and power consumption.

Figure 6:
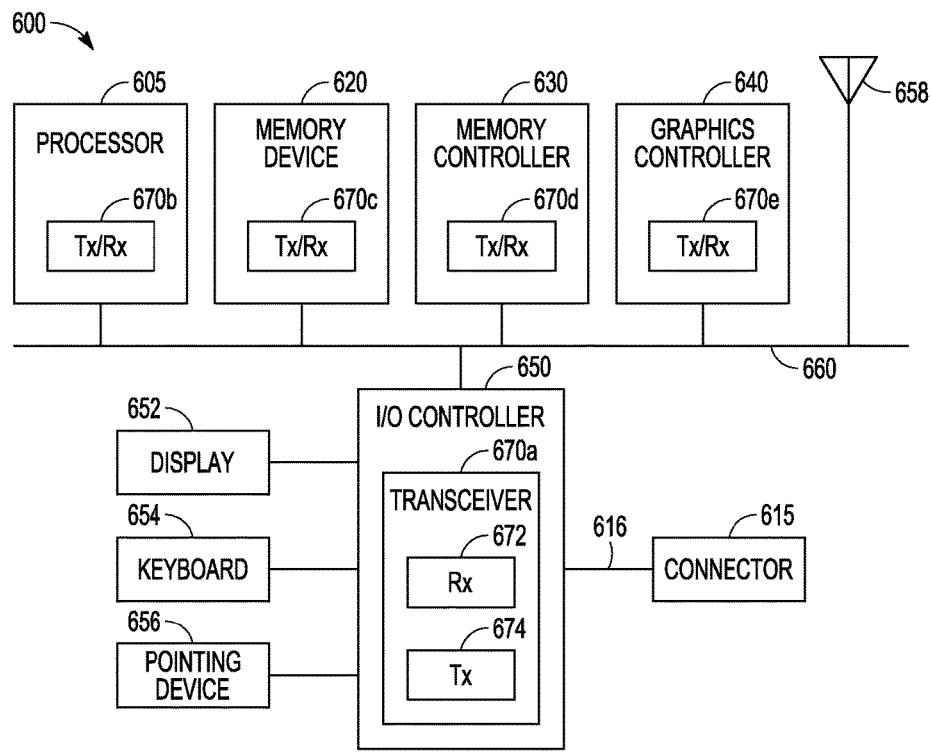
FIG. 6 shows an apparatus in the form of a system (e.g., electronic system), according to some embodiments described herein.

FIG. 6 shows an apparatus in the form of a system (e.g., electronic system) 600, according to some embodiments described herein. System 600 can include or be included in a computer, a tablet, or other electronic systems. As shown in FIG. 6, system 600 can include a processor 605, a memory device 620, a memory controller 630, a graphics controller 640, an input and output (I/O) controller 650, a display 652, a keyboard 654, a pointing device 656, at least one antenna 658, a connector 615, and a bus 660.

Each of processor 605, memory device 620, memory controller 630, graphics controller 640, and I/O controller 650 can include an IC chip (e.g., device 101 or 102 of FIG. 1).

In some arrangements, system 600 does not have to include a display. Thus, display 652 can be omitted from system 600. In some arrangements, system 600 does not have to include any antenna. Thus, antenna 658 can be omitted from system 600.

Processor 605 can include a general-purpose processor or an application specific integrated circuit (ASIC). Processor 605 can include a central processing unit (CPU).

Memory device 620 can include a dynamic random access memory (DRAM) device, a static random access memory (SRAM) device, a flash memory device, phase change memory, a combination of these memory devices, or other types of memory. FIG. 6 shows an example where memory device 620 is a stand-alone memory device separated from processor 605. In an alternative arrangement, memory device 620 and processor 605 can be located on the same die. In such an alternative arrangement, memory device 620 is an embedded memory in processor 605, such as embedded DRAM (eDRAM), embedded SRAM (eSRAM), embedded flash memory, or another type of embedded memory.

Display 652 can include a liquid crystal display (LCD), a touchscreen (e.g., capacitive or resistive touchscreen), or another type of display. Pointing device 656 can include a mouse, a stylus, or another type of pointing device.

I/O controller 650 can include a communication module for wired or wireless communication (e.g., communication through one or more antenna 658). Such wireless communication may include communication in accordance with WiFi communication technique, Long Term Evolution Advanced (LTE-A) communication technique, or other communication techniques.

I/O controller 650 can also include a module to allow system 600 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), and other specifications.

Connector 615 can be arranged (e.g., can include terminals, such as pins) to allow system 600 to be coupled to an external device (or system). This may allow system 600 to communicate (e.g., exchange information) with such a device (or system) through connector 615. Connector 615 may be coupled to I/O controller 650 through a connection 616 (e.g., a bus).

Connector 615, connection 616, and at least a portion of bus 660 can include conductive lines that conform with at least one of USB, DP, HDMI, Thunderbolt, PCIe, and other specifications.

I/O controller 650 can include a transceiver (Tx/Rx) 670a having a receiver (Rx) 672 and a transmitter (Tx) 674. Transmitter 674 can operate to transmit information from I/O controller 650 to another part of system 600 or to an external device (or system) coupled to connector 615. Receiver 672 can operate to allow I/O controller 650 to receive information from another part of system 600 or from an external device (or system) coupled to connector 615. Receiver 672 can include any of the receivers described above with reference to FIG. 1 through FIG. 5.

As shown in FIG. 6, processor 605, memory device 620, memory controller 630, and graphics controller 640 can include transceivers 670b, 670c, 670d, and 670e, respectively, to allow each of these components to transmit and receive information through their respective transceiver. At least one of transceivers 670b, 670c, 670d, and 670e can be similar to or identical to transceiver 670a. Thus, at least one of transceivers 670b, 670c, 670d, and 670e can include a receiver similar to or identical to receiver 672. For example, at least one of transceivers 670a, 670b, 670c, 670d, and 670e can include a receiver that can be arranged to allow at least one of processor 605, memory device 620, memory controller 630, and graphics controller 640 to receive information (e.g., signals) from another part of system 600 or from an external device (or system) coupled to connector 615.

FIG. 6 shows the components of system 600 arranged separately from each other as an example. For example, each of processor 605, memory device 620, memory controller 630, graphics controller 640, and I/O controller 650 can be located on a separate IC (e.g., semiconductor die or an IC chip). In some arrangements, two or more components (e.g., processor 605, memory device 620, graphics controller 640, and I/O controller 650) of system 600 can be located on the same die (e.g., same IC chip) that forms a system-on-chip (SoC).

Figure 7:
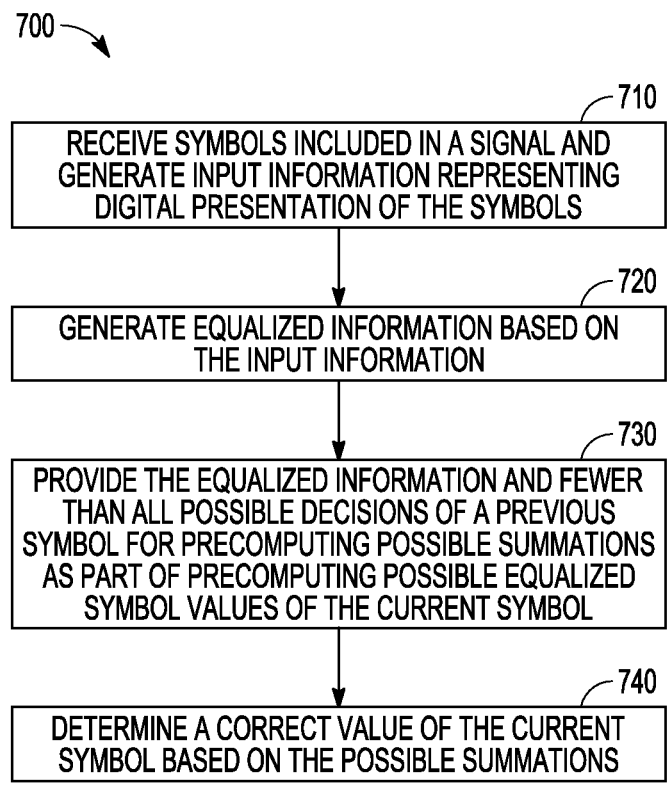
FIG. 7 is a flowchart showing a method of operating a receiver, according to some embodiments described herein.

FIG. 7 is a flowchart showing a method 700 of operating a receiver, according to some embodiments described herein. The receiver used in method 700 can include any of the receivers described above with reference to FIG. 1 through FIG. 6. Some of the activities in method 700 may be performed by hardware, software, firmware, or any combination of hardware, software, and firmware.

As shown in FIG. 7, activity 710 of method 700 can include receiving symbols included in a signal (e.g., at an ADC) and generating input information representing digital presentation of the symbols. Activity 720 can include generating equalized information (e.g., using a primary FFE), based on the input information. Activity 730 can include providing the equalized information and fewer than all possible decisions of a previous symbol to summers of a DFE for precomputing possible summations as part of precomputing possible equalized symbol values of the current symbol. Activity 740 can include determining a correct value of the current symbol based on the possible summations.

Method 700 can include fewer or more activities relative to activities 710, 720, 730, and 740 shown in FIG. 7. For example, method 700 can include activities and operations of a receiver and receiver lane described above with reference to FIG. 1 through FIG. 6.

The illustrations of the apparatuses (e.g., apparatus 100 including receivers 104 and 304, and system 600) and methods (e.g., method 700 and operations of receivers 104 and 304, and system 600) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

ADDITIONAL NOTES AND EXAMPLES

Example 1 includes subject matter (such as a device, an electronic apparatus (e.g., circuit, electronic system, or both), or a machine) including an input node, an analog to digital converter (ADC) including an input coupled to the input node, a first feedforward equalizer (FFE) including an input coupled to an output of the ADC, a second FFE including an input coupled to the output of the ADC, and a decision feedback equalizer (DFE) including a first input, a second input, and an output, the first input coupled to an output of the first FFE, and the second input coupled to an output of the second FFE. summations.

In Example 2, the subject matter of Example 1 may optionally include, wherein the DFE includes an N-tap look-ahead loop-unrolled DFE, where N is the number of taps in the DFE.

In Example 3, the subject matter of Example 1 or 2 may optionally include, wherein the input node is configured to receive input information including symbols, and each of the symbols includes an amplitude value representing a value of multiple bits of the input information.

In Example 4, the subject matter of Example 1 or 2 may optionally include, wherein the DFE includes S summers, where S is an integer, and $$S = \sum_{i=1}^{N} 2^i$$

where N is the number of taps in the DFE.

In Example 5, the subject matter of Example 1 or 4 may optionally include, wherein the DFE includes C slicers, where C is an integer, and $C=2^N$ where N is the number of taps in the DFE.

In Example 6, the subject matter of Example 1 or 2 may optionally include, wherein the second FFE includes fewer taps than the first FFE.

In Example 7, the subject matter of Example 1 or 2 may optionally include, wherein the second FFE includes an output coupled to select inputs of multiplexer circuits of the DFE.

In Example 8, the subject matter of Example 1 or 2 may optionally include, further comprising an additional input node, an additional ADC including an input coupled to the additional input node, a first additional FFE including an input coupled to an output of the additional ADC, a second additional FFE including an input coupled to the output of the additional ADC, and an additional DFE including a first input, a second input, and an output, the first input coupled to an output of the first additional FFE, and the second input coupled to an output of the second additional FFE.

Example 9 includes subject matter (such as a device, an electronic apparatus (e.g., circuit, electronic system, or both), or a machine) including an analog to digital converter (ADC) to receive symbols included in a signal and generate input information representing digital presentation of the symbols, a feedforward equalizer (FFE) to generate equalized information based on the input information, and a decision feedback equalizer (DFE) to receive the equalized information and precompute possible equalized symbol values of a current symbol included in the symbols and as part of precomputing the possible equalized symbol values of the current symbol, precompute possible summations based at least in part on fewer than all possible decisions of a previous symbol among the symbols, and to determine a correct value of the current symbol based on the possible summations.

In Example 10, the subject matter of Example 9 may optionally include, wherein the DFE includes multiplexer circuits to select a portion of all possible decisions of a previous symbol among the symbols in order to provide the fewer than all possible decisions.

In Example 11, the subject matter of Example 9 or 10 may optionally include, wherein each of the symbols is associated with B bits, where B is an integer greater than two, and the fewer than all possible decisions is less than $2^B$.

In Example 12, the subject matter of Example 9 or 10 may optionally include, an additional FFE to perform a partial equalization operation on the previous symbol to provide select information to the multiplexer circuits to allow the multiplexer circuits to select a portion of all possible decisions based on the value of the select information.

In Example 13, the subject matter of Example 9 or 10 may optionally include, wherein comprising an additional FFE to perform a partial equalization operation on the previous symbol to identify a most-likely voltage value range associated with the previous symbol in order to eliminate a portion of all possible decisions from the precomputing of possible summations.

Example 14 includes subject matter (such as a device, an electronic apparatus (e.g., circuit, electronic system, or both), or a machine) including conductive lines on a circuit board, a first device coupled to the conductive lines, and a second device coupled to the conductive lines, the second device including a receiver, the receiver including an input node, an analog to digital converter (ADC) including an input coupled to the input node, a first feedforward equalizer (FFE) including an input coupled to an output of the ADC, a second feedforward equalizer (FFE) including an input coupled to the output of the ADC, and a decision feedback equalizer (DFE) including a first input, a second input, and an output, the first input coupled to an output of the first FFE, and the second input coupled to an output of the second FFE.

In Example 15, the subject matter of Example 14 may optionally include, wherein one of the first and second devices includes a processor.

In Example 16, the subject matter of Example 14 may optionally include, wherein at least one of the first and second devices includes an integrated circuit chip.

In Example 17, the subject matter of Example 14 may optionally include, wherein the conductive lines conform with at least one of Universal Serial Bus (USB), DisplayPort (DP), High-Definition Multimedia Interface (HDMI), Thunderbolt, and Peripheral Component Interconnect Express (PCIe) specifications.

Example 18 includes subject matter (such as a method of operating a device, an electronic apparatus (e.g., circuit, electronic system, or both), or a machine) including receiving symbols included in a signal at an analog to digital converter (ADC) and generating input information representing a digital presentation of the symbols, generating equalized information, using a feedforward equalizer (FFE), based on the input information, providing the equalized information and fewer than all possible decisions of a previous symbol to summers of the DFE for precomputing possible summations as part of precomputing possible equalized symbol values of the current symbol, and determining a correct value of the current symbol based on the possible summations.

In Example 19, the subject matter of Example 18 may optionally include, further comprising partially performing an equalization operation on a digital presentation of the previous symbol to identify most-likely decisions among all possible decisions of the previous symbol, wherein the fewer than all possible decisions of the previous symbol include the most-likely decisions.

In Example 20, the subject matter of Example 18 or 19 may optionally include, wherein the signal is modulated based on pulse-amplitude modulation (PAM) technique including 4-PAM technique.

Example 21 includes subject matter (such as a device, an electronic apparatus (e.g., circuit, electronic system, or both), or a machine) including means for performing any of the methods of Examples 18-20.

The subject matter of Example 1 through Example 21 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
an input node;
an analog to digital converter (ADC) including an input coupled to the input node;
a first feedforward equalizer (FFE) including an input coupled to an output of the ADC;
a second FFE including an input coupled to the output of the ADC; and
a decision feedback equalizer (DFE) including a first input, a second input, and an output, the first input coupled to an output of the first FFE, the second input coupled to an output of the second FFE, and the output of the DFE configured to generate an equalization signal, wherein the DFE includes an N-tap look-ahead loop-unrolled DFE, where N is the number of taps in the DFE, a multiplexer, the multiplexer including inputs, outputs, and a select input coupled to the output of the second FFE to select information at least one of the inputs to be information at least one of the outputs, and C slicers coupled to the inputs of the multiplexer, where C is an integer, and $C=2^N$.

2. An apparatus comprising:
an input node;
an analog to digital converter (ADC) including an input coupled to the input node;
a first feedforward equalizer (FFE) including an input coupled to an output of the ADC;
a second FFE including an input coupled to the output of the ADC; and
a decision feedback equalizer (DFE) including a first input, a second input, and an output, the first input coupled to an output of the first FFE, the second input coupled to an output of the second FFE, and the output of the DFE configured to generate an equalization signal, and the second input coupled to an output of the second FFE, wherein the DFE includes S summers, where S is an integer, and $$S = \sum_{i=1}^{N} 2^i$$

where N is the number of taps in the DFE.

3. An apparatus comprising:
an input node;
an analog to digital converter (ADC) including an input coupled to the input node;
a first feedforward equalizer (FFE) including an input coupled to an output of the ADC to receive digital information from the ADC;
a second FFE including an input coupled to the output of the ADC to receive the same digital information from the ADC as the first FFE; and
a decision feedback equalizer (DFE) including a first input, a second input, and an output, the first input coupled to an output of the first FFE, the second input coupled to an output of the second FFE, and the output of the DFE configured to generate an equalization signal, wherein the input node is configured to receive input information including symbols, and each of the symbols includes an amplitude value representing a value of multiple bits of the input information, wherein the DFE includes C slicers, where C is an integer, and $C=2^N$ where N is the number of taps in the DFE.

4. An apparatus comprising:
an input node;
an analog to digital converter (ADC) including an input coupled to the input node;
a first feedforward equalizer (FFE) including an input coupled to an output of the ADC;
a second FFE including an input coupled to the output of the ADC; and
a decision feedback equalizer (DFE) including a first input, a second input, and an output, the first input coupled to an output of the first FFE, the second input coupled to an output of the second FFE, and the output of the DFE configured to generate an equalization signal, wherein the second FFE includes fewer taps than the first FFE, and wherein the DFE includes C slicers, where C is an integer, and $C=2^N$ where N is the number of taps in the DFE.

5. An apparatus comprising:
an input node;
an analog to digital converter (ADC) including an input coupled to the input node;
a first feedforward equalizer (FFE) including an input coupled to an output of the ADC to receive digital information from the ADC;
a second FFE including an input coupled to the output of the ADC to receive the same digital information from the ADC as the first FFE;
a decision feedback equalizer (DFE) including a first input, a second input, and an output, the first input coupled to an output of the first FFE, the second input coupled to an output of the second FFE, and the output of the DFE configured to generate an equalization signal, wherein the DFE includes C slicers, where C is an integer, and $C=2^N$ where N is the number of taps in the DFE;
an additional input node;
an additional ADC including an input coupled to the additional input node;
a first additional FFE including an input coupled to an output of the additional ADC to receive digital information from the additional ADC;
a second additional FFE including an input coupled to the output of the additional ADC to receive the same digital information from the additional ADC as the first additional FFE; and
an additional DFE including a first input, a second input, and an output, the first input coupled to an output of the first additional FFE, the second input coupled to an output of the second additional FFE, and the output of the second additional DFE configured to generate an additional equalization signal.

6. An apparatus comprising:
an analog to digital converter (ADC) configured to receive symbols included in a signal and generate input information representing digital presentation of the symbols;
a feedforward equalizer (FFE) configured to generate equalized information based on the input information; and
a decision feedback equalizer (DFE) including a multiplexer having inputs, outputs, and a select input coupled to an output of the FFE to select information at least one of the inputs to be information at least one of the outputs, the DFE configured to receive the equalized information and precompute possible equalized symbol values of a current symbol included in the symbols and as part of precomputing the possible equalized symbol values of the current symbol, precompute possible summations based at least in part on fewer than all possible decisions of a previous symbol among the symbols, and to determine a correct value of the current symbol based on the possible summations, wherein the DFE further includes C slicers coupled to the inputs of the multiplexer, where C is an integer, and $C=2^N$ where N is the number of taps in the DFE.

7. The apparatus of claim 6, wherein each of the symbols is associated with B bits, where B is an integer greater than two, and the fewer than all possible decisions is less than $2^B$.

8. An apparatus comprising:
an analog to digital converter (ADC) configured to receive symbols included in a signal and generate input information representing digital presentation of the symbols;
a feedforward equalizer (FFE) configured to generate equalized information based on the input information; and
a decision feedback equalizer (DFE) configured to receive the equalized information and precompute possible equalized symbol values of a current symbol included in the symbols and as part of precomputing the possible equalized symbol values of the current symbol, precompute possible summations based at least in part on fewer than all possible decisions of a previous symbol among the symbols, and to determine a correct value of the current symbol based on the possible summations, wherein the DFE includes multiplexer circuits configured to select a portion of all possible decisions of the previous symbol among the symbols in order to provide the fewer than all possible decisions.

9. The apparatus of claim 8, further comprising an additional FFE configured to perform a partial equalization operation on the previous symbol to provide select information to the multiplexer circuits to allow the multiplexer circuits to select a portion of all possible decisions based on the value of the select information.

10. The apparatus of claim 8, further comprising an additional FFE configured to perform a partial equalization operation on the previous symbol to identify a most-likely voltage value range associated with the previous symbol in order to eliminate a portion of all possible decisions from the precompute possible summations.

11. An electronic system comprising:
conductive lines on a circuit board;
a first integrated circuit coupled to the conductive lines; and
a second integrated circuit coupled to the conductive lines, the second integrated circuit including a receiver, the receiver including:
an input node;
an analog to digital converter (ADC) including an input coupled to the input node;
a first feedforward equalizer (FFE) including an input coupled to an output of the ADC to receive digital information from the ADC;
a second feedforward equalizer (FFE) including an input coupled to the output of the ADC to receive the same digital information from the ADC as the first FFE; and
a decision feedback equalizer (DFE) including a first input, a second input, and an output, the first input coupled to an output of the first FFE, the second input coupled to an output of the second FFE, and the output of the DFE configured to generate an equalization signal, wherein the DFE includes C slicers, where C is an integer, and $C=2^N$ where N is the number of taps in the DFE.

12. The electronic system of claim 11, wherein one of the first and second integrated circuits includes a processor.

13. The electronic system of claim 11, wherein at least one of the first and second integrated circuits includes an integrated circuit chip.

14. The electronic system of claim 11, wherein the conductive lines conform with at least one of Universal Serial Bus (USB), DisplayPort (DP), High-Definition Multimedia Interface (HDMI), Thunderbolt, and Peripheral Component Interconnect Express (PCIe) specifications.

\* \* \* \* \*

UNITED STATES PATENT AND TRADEMARK OFFICE
CERTIFICATE OF CORRECTION

PATENT NO. : 10,263,663 B2
APPLICATION NO. : 14/973163
DATED : April 16, 2019
INVENTOR(S) : Kiran et al.

Page 1 of 1

It is certified that error appears in the above-identified patent and that said Letters Patent is hereby corrected as shown below:

In the Claims

In Column 15, Lines 40-41, Claim 2, delete "signal, and the second input coupled to an output of the second FFE," and insert --signal-- therefor Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*